United States Patent [19]

Lii

[11] Patent Number: 5,218,385
[45] Date of Patent: Jun. 8, 1993

[54] FLASH LIGHT EYEGLASSES WITH HINGE SWITCH

[76] Inventor: Jein-Hei Lii, No. 38, Chung-Te 9th Street, Tainan, Taiwan

[21] Appl. No.: 852,715

[22] Filed: Mar. 17, 1992

[51] Int. Cl.$^5$ .............................................. G02C 1/00
[52] U.S. Cl. ...................................... 351/158; 351/41
[58] Field of Search ......................... 351/41, 158, 153; 362/103, 104, 802; 16/228

[56] References Cited

U.S. PATENT DOCUMENTS 4,254,451 3/1981 Cochnan ............................ 351/158

*Primary Examiner*—Rodney B. Bovernick
*Attorney, Agent, or Firm*—Morton J. Rosenberg; David I. Klein

[57] ABSTRACT

A pair of flash eyeglasses has a switch positioned in a space between two screw projections at one end of a frame fitted with a flash light board therein. A skull temple has an ear at one end to be combined between the two projections in the frame with a screw so that the skull temple can swing open or closes with the screw as a pivot. A switch is placed in the space between the two projections in the frame to be pressed or released to turn on or off a circuit of the flash light board by the ear in the skull temple when the skull temple is swung open or closed.

1 Claim, 4 Drawing Sheets

FLASH LIGHT EYEGLASSES WITH HINGE SWITCH

BACKGROUND OF THE INVENTION

A pair of conventional flash light eyeglasses such as that shown in FIG. 7 has a switch button 11 on a frame and the switch button is to be pressed manually by a user for the flash light board to be turned on. The eyeglasses may have to be taken down and put on again every time when the switch has to be pressed for turning on or off the circuit of the flash light board. Therefore, a conventional flash light eyeglasses is quite inconvenient to use.

SUMMARY OF THE INVENTION

The flash light eyeglasses in the present invention has been improved to have a hidden switch for the circuit of the flash light board. The switch can automatically be turned on when a skull temple is swung open for wearing the eyeglasses, and the switch can be turned off automatically when the skull temple is swung closed to lie parallel to the frame for putting away the eyeglasses.

DETAILED DESCRIPTION OF THE INVENTION

Figure 2:
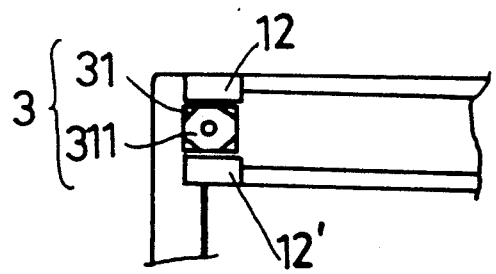
FIG. 2 is a front view of the switch in the flash light eyeglasses in the present invention.
Figure 1:
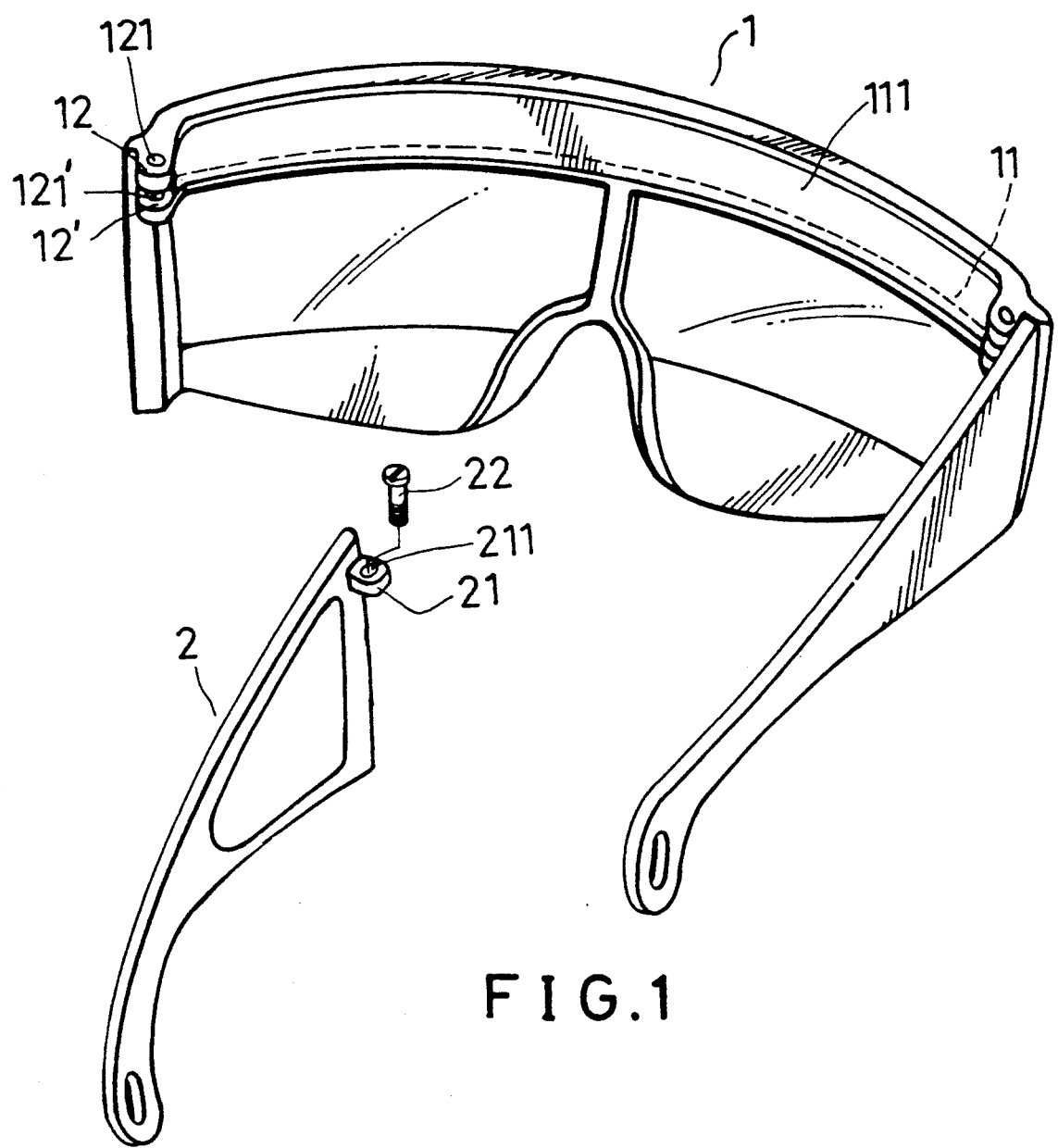
FIG. 1 is an exploded perspective view of the flash light eyeglasses in the present invention.

The flash light eyeglasses in the present invention, as shown in FIGS. 1 and 2, comprises a frame 1, a skull temple 2, and a switch 3, a flash light board 111 as its main components.

The frame 1 for fitting in the flash light board 111 has a lengthwise groove in the lower lengthwise edge for the flash light board 111 to fit therein, and two screw projections 12, 12' bored with a threaded holes 121, 121' at one end.

The skull temple 2 has an ear 21 projecting inward from one end and a hole 211 bored in the ear 2 for a screw 22 to pass through to combine the skull temple 2 with the frame 1 by screwing with the threaded holes 121, 121' in the two screw projections 12, 12', in the frame, and the ear 21 is inserted in a space between the two screw projections 12, 12'. Then the skull temple 2 can be swung with the screw 22 as a pivot to the left for wearing the eyeglasses or to the right to be folded to lie parallel to the frame 1 for putting away the eyeglasses.

The switch 3 has a circuit board 31 and an elastic conductor 311 welded on the circuit board 31, positioned steady between the upper and the lower projections 12, 12'. The circuit board 31 is to be turned on with the elastic conductor 311 pressed by the ear 21 when the skull temple 2 is swung open to the left. The circuit board 31 is to be turned off with the elastic conductor 311 released by the ear 21 when the skull temple 2 is swung closed to the right to lie near the frame 1.

Figures 3, 4:
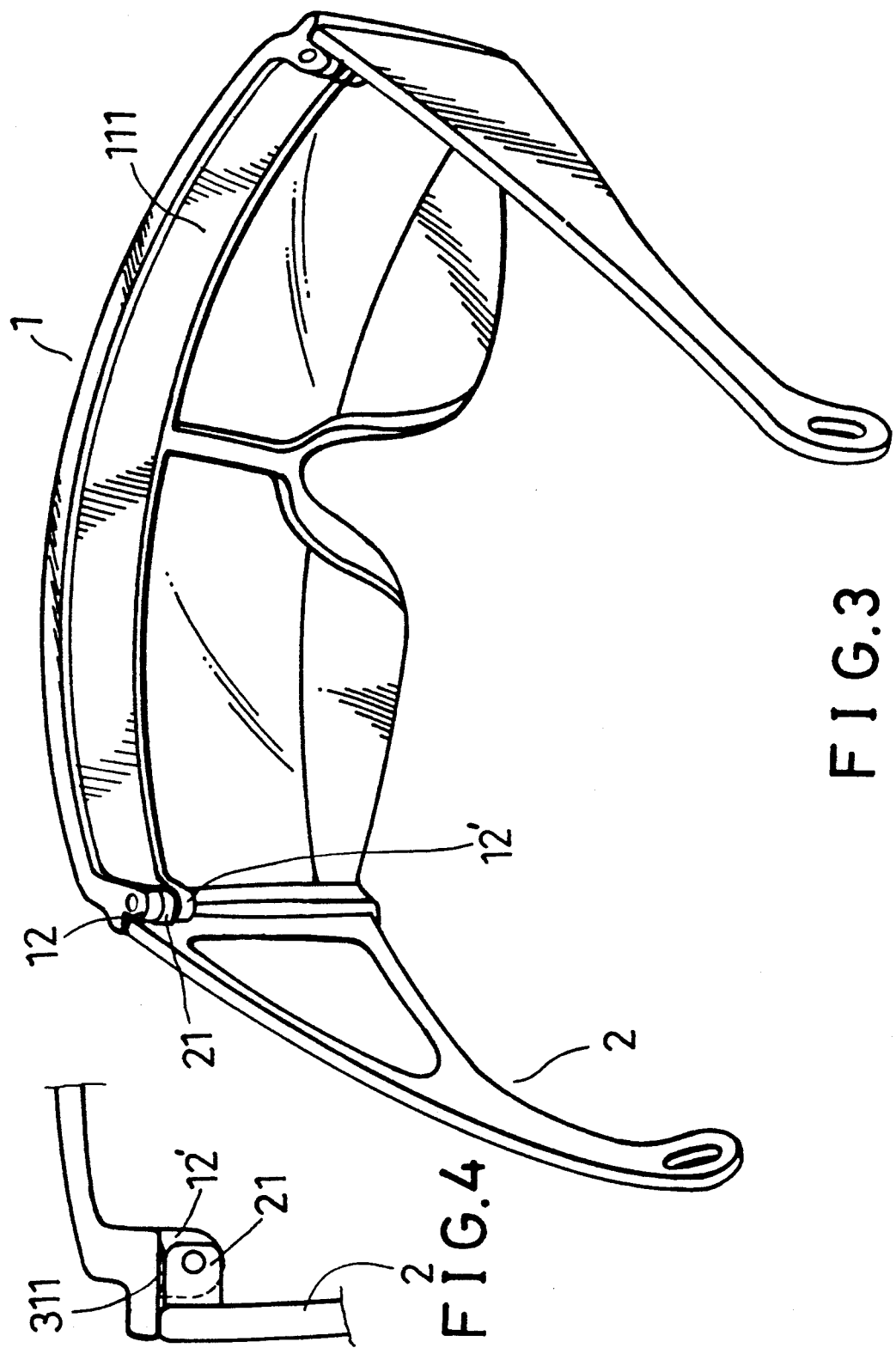
FIG. 3 is a perspective view of the switch in pressed condition in the flash light eyeglasses when the skull temple is swung open in the present invention.
FIG. 4 is an upside view of the conductor in pressed condition in the flash light eyeglasses when the skull temple is swung open in the present invention.

Referring to FIGS. 3 and 4, how the switch 3 of the flash light works is described. After the skull temple 2 is combined with the frame 1, the ear 21 sandwiched between the two screw projections 12, 12' moves with swinging of the skull temple 2. So when the skull temple 2 is swung open forming 90° against the frame 1, the ear 21 also turns to press the elastic conductor 311 on the circuit board 31, then the conductor 311 turns on the circuit to power the flash light board 311 to flash on and off.

Figure 6:
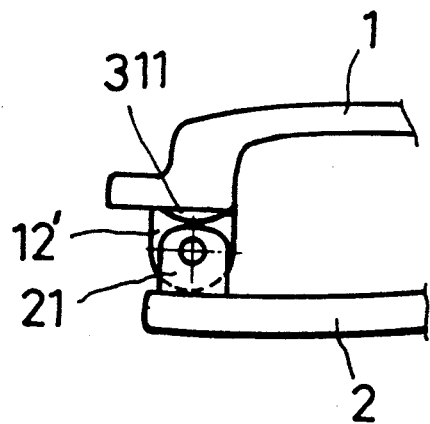
FIG. 6 is an upside view of the conductor separated from the ear in the skull temple when the skull temple is swung closed in the present invention.
Figure 5:
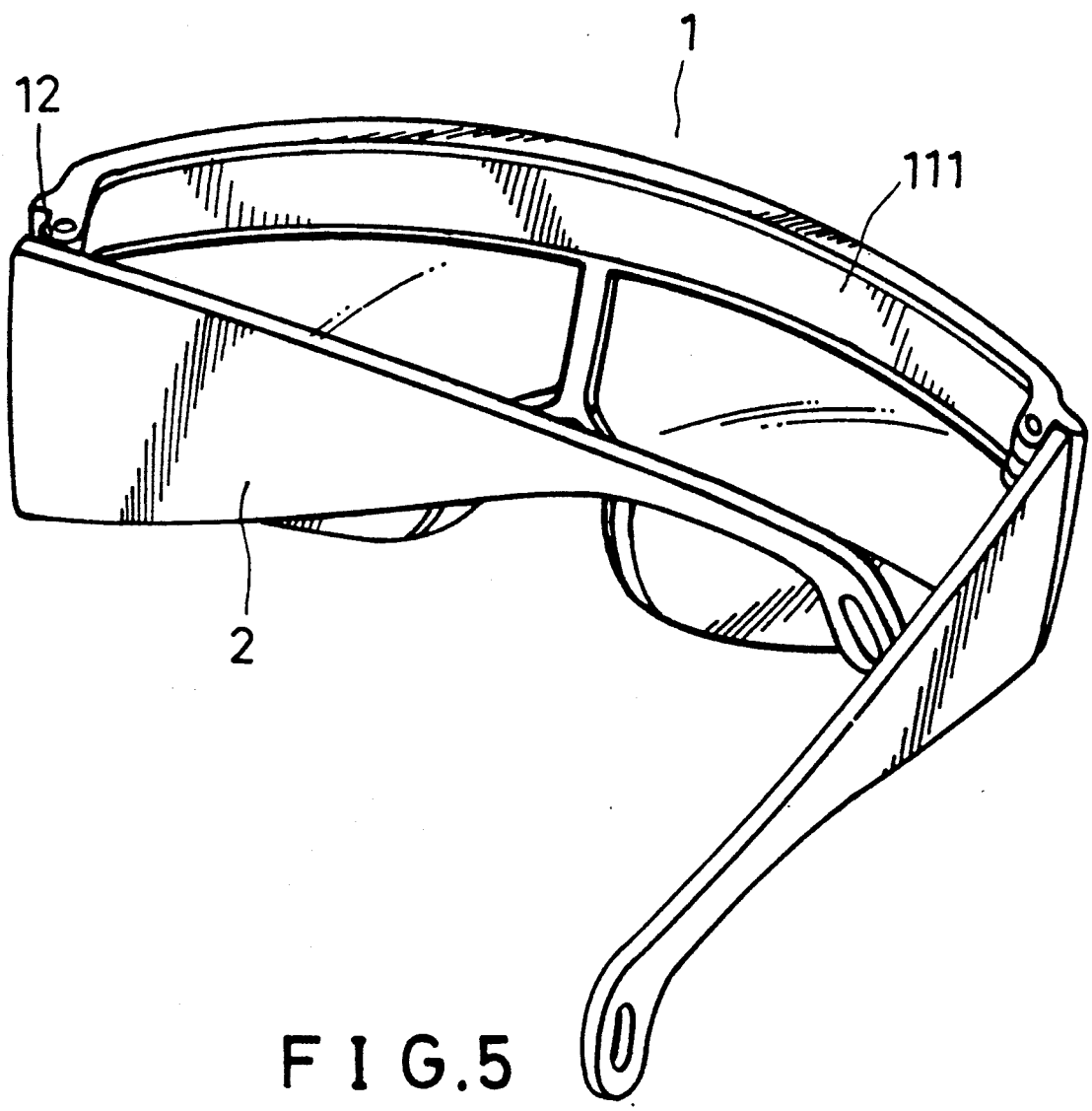
FIG. 5 is a perspective view of the skull temple closed and the switch turned off in the flash light eyeglasses in the present invention.
Figure 7:
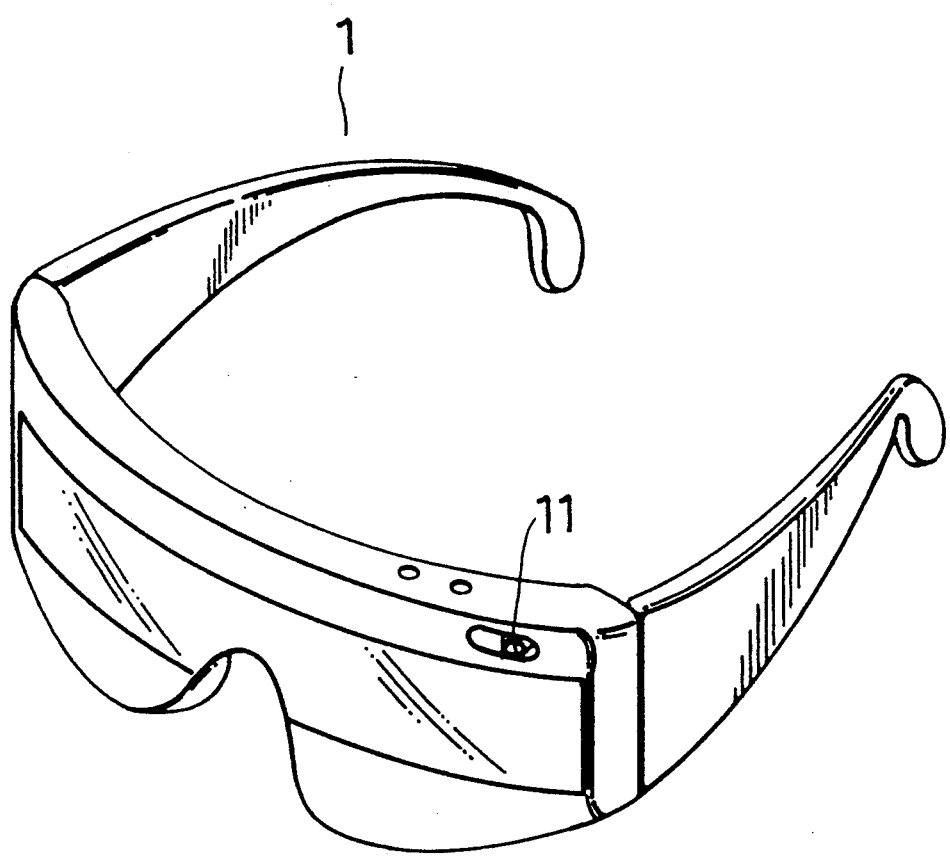
FIG. 7 is a perspective view of a conventional flash light eyeglasses with a button switch.

Referring to FIGS. 5 and 6, if the skull temple 2 is swung from the position shown in FIG. 3 wherein the flash light is on, to the position shown in FIG. 5 wherein the ear 21 does not press the elastic conductor 311, the circuit of the flash light board 311 is turned off.

The switch 3, controlling the circuit of the flash light board 311, is automatically turned on or off by swinging of the skull temple 2 for wearing the eyeglasses or for putting away the eyeglasses. Therefore the eyeglasses do not need additional manual work to turned on or off the flash light board 111 as conventional flash light eyeglasses do. Since the switch 3 is hidden, it does not impair the outer appearance and the wholeness of the eyeglasses.

What is claimed is:

1. A pair of flash light eyeglasses comprising:

a frame for fitting a flash light board therein, having one end provided with two, one upper and one lower, screw projections bored with a vertical threaded hole for a screw to engage in to combine the frame with a skull temple;

a skull temple having an ear with a through hole at one end to be inserted in the space between the two screw projections in said frame, said through hole being passed through by the screw fitting in the two screw projections in said frame to combine the skull temple with the frame;

a switch consisting of a circuit board and an elastic conductor placed in the space between the two screw projections in said frame abutting on the ear of the skull temple; and said ear in the skull temple pressing said elastic conductor to turn on the switch connected with the flash light board, which then is powered to give out flash light when the skull temple is swung open for wearing the eyeglasses, and said ear in the skull temple releasing said elastic conductor to turn off the switch of the flash light board which is then cut off when the skull temple is swung closed to lie near the frame.

* * * * *